United States Patent
Walles

[11] 3,765,742
[45] Oct. 16, 1973

[54] OPTICAL DEVICE
[75] Inventor: Sten Walles, Lidingo, Sweden
[73] Assignee: AGA Aktiebolag, Lidingo, Sweden
[22] Filed: June 7, 1972
[21] Appl. No.: 260,594

[30] Foreign Application Priority Data
June 7, 1971 Sweden.............................. 7386/71

[52] U.S. Cl...................... 350/7, 350/273, 350/285, 350/299
[51] Int. Cl. ........................................... G02b 17/00
[58] Field of Search............ 350/6, 7, 266, 271–275, 350/285, 299; 356/23–26

[56] References Cited
UNITED STATES PATENTS
1,840,799   1/1932   Waddell................................. 350/6
1,821,349   9/1931   Leventhal.............................. 350/6

Primary Examiner—David Schonberg
Assistant Examiner—Michael J. Tokar
Attorney—Lawrence I. Lerner et al.

[57] ABSTRACT

The present invention relates to a device to produce, starting from a slit scanned in its transverse direction, alternately two slits scanned at a certain angle to each other in their transverse directions in the same image plane. Starting with the slit scanned in its transverse direction, the device in accordance with the invention produces two slits scanned at a certain angle to each other in their transverse directions in the same image plane. This slit scanned in its transverse direction may be generated, for example, by means of a device comprising a straight, equilateral, transmitting polygonal cylinder placed behind a stationary slit which is arranged to rotate about its axis of symmetry parallel to the longitudinal direction of the slit.

The two slits scanning in the same image plane at a certain angle to each other in their transverse directions are generated by means of the device built in accordance with the principles of the present invention by dividing the light alternately in time between two alternative ray paths. The device including a rotating glass disk with reflecting areas being used for the division and the ray paths have such optical characteristics that the timing of the scanning slits is not affected by wobble in the bearings of the rotating glass disk.

4 Claims, 2 Drawing Figures

OPTICAL DEVICE

BACKGROUND OF THE INVENTION

The present invention relates to a device to produce, starting from a slit scanned in its transverse direction, alternately two slits scanning at a certain angle to each other in their transverse directions in the same image plane. The slit scans in its transverse direction and produces two slits scanned at a certain angle to each other in their transverse directions in the same image plane.

The two slits scanned in the same image plane at a certain angle to each other in their transverse directions are generated by means of a device which divides the light alternately in time between two alternative ray paths utilizing a rotating glass disk with reflecting areas used for the division.

The "out-of-true" of wobble in the bearings of the glass disk is harmful as it generally has a disturbing effect on the timing of the scanning slits. It is not possible, however, in principle to eliminate at the same time the effect of the radial and of the axial "out-of-true."

SUMMARY OF THE INVENTION

The present invention realtes to a device to produce, starting from a slit scanning in its transverse direction, alternately two slits scanning at a certain angle to each other in their transverse directions in a common image plane. The device includes a first and a second optical system with image-turning means and a transmitting disk which is provided with a reflecting layer covering certain parts of the one lateral surface of the disk. The disk is arranged so that it rotates about an axis perpendicular to the lateral surface so that the light from the incident scanning slit is alternately reflected first on a portion of the reflecting layer, whereupon it passes through the first optical system and is reflected on another portion of the reflecting layer so that the image of the slit generated by the first system falls into a common image plane; and secondly it is transmitted through the disk, whereupon it passes through a second optical system and is again transmitted through the disk so that the image of the slit generated by the second system falls into the common image plane. The scanning slit so oriented and the image-turning means in the optical systems are so arranged that the desired angle is obtained between the two scanning slit images generated.

The first and the second optical system are so designed that they are substantially telescopic on the object side and on the image side, and their angular magnifications are substantially unity.

BRIEF DESCRIPTION OF THE DRAWINGS

The device in accordance with the invention will be described in the following in detail with the help of the enclosed drawing in which.

DETAILED DESCRIPTION OF THE INVENTION

Figure 1:
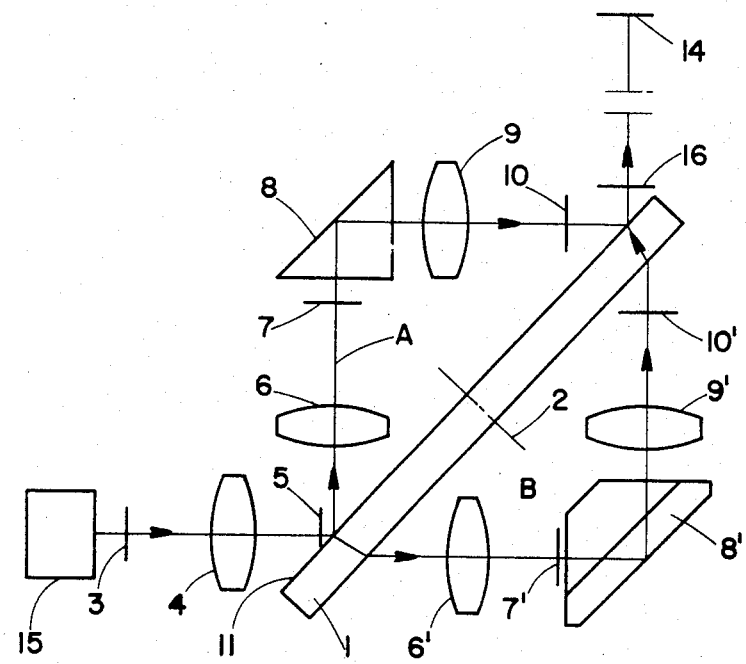
FIG. 1 shows an embodiment of the device and FIG. 2 shows an embodiment of a detail in the device of FIG. 1.

The device in accordance with the invention comprises a rotating glass disk which is designated 1 in FIG. 1. This glass disk is of circular shape and is arranged to rotate about an axis of rotation 2. The device comprises further a first and a second optical system 6, 8, 9 and 6', 8' and 9', respectively. The light in the form of a scanning slit 3 falls on the device through a lens 4 followed by the first and second optical system which are telescopic on the object side.

The first optical system may consist, for example, as in FIG. 1 of two lenses 6 and 9 and a reflecting prism 8. The second optical system may consist for example as in FIG. 1 1f lenses 6' and 9' and a double-reflecting roof prism 8'.

Furthermore, a number of image planes 5, 7, 10, 7', 10' have been marked in FIG. 1 for a better illumination of the function of the device. Moreover, an image plane is indicated by numeral 14 in which the two slits scanning in their transverse directions at a certain angle to each other are imaged.

The ray path through the first optical system is designated by A and the ray path through the second optical system is designated by B.

Figure 2:
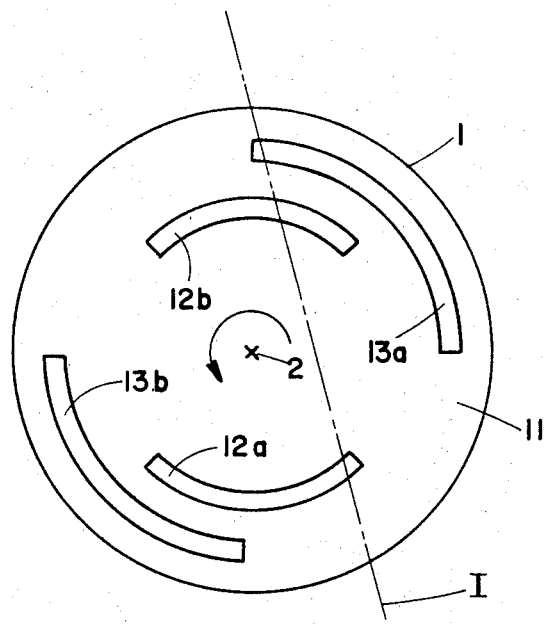

In FIG. 2 there is shown one of the lateral surfaces of the glass disk 1. This lateral surface is covered in certain parts 12a, 12b, 13a, 13b with a reflecting material. The section I marked in FIG. 2 relates to a plane which passes through the ray paths A and B.

The scanning slit formed by means of a device 15 in the object plane 3 in FIG. 1 enters into the device in accordance with the invention through the lens 4. This lens 4 generates a pupillary image at 5. The ray path A arises through reflection on a reflecting area, for example 12a, on the glass disk 1. The lens 6 in the first optical system images the object plane 3 in the image plane 7. After mirroring in the reflecting prism 8 the image formation in the lens 9 occurs so that a pupillary image 10 is obtained of the pupillary image 5. The light through the ray path A leaves the device in accordance with the invention at 16 after reflection on, for example, the reflecting area 13a on the glass disk 1, and generates a scanning slit in the image plane 14.

The ray path B arises at transmission through the glass disk 1 in the position when the reflecting area 12a has been rotated out of the way of the beam through the lens 4 and equally the reflecting area 13a has been rotated out of the way of the beam through the lens 9'. The lens 6' in the second optical system images the object plane 3 in the image plane 7'. After mirroring in the double-reflecting roof prism 8' image formation occurs in the lens 9' so that a pupillary image 10' is obtained of the pupillary image 5. The light through the ray path B leaves the device in accordance with the invention at 16 after transmission through the glass disk 1, and generates a scanning slit on the image plane 14.

The glass disk 1, as mentioned before, is covered in certain parts with a reflecting layer. This layer is so arranged that the light rays which fall on the glass disk through the lens 4 during the rotation of the glass disk 1 will fall for example first along the reflecting area 12a. The glass disk 1 is transparent between the reflecting layers so that, when the reflecting layer 12a has been rotated out of the way of the incident light ray, the latter will be transmitted through the glass disk during the rotation of the disk, until the reflecting layer 12b is rotated into the path of the light ray. When a reflecting layer is situated in the path of the incident light ray, a second reflecting layer 13a or 13b is situated at the same time so that the light ray after passage through the first optical system strikes these second reflecting layers 13a or 13b, respectively. The layers are further arranged so that when the incident light ray is transmitted through the disk 1 this light ray will also, after passage through the second optical system, be transmitted through the disk 1.

The ray paths A and B, as mentioned earlier, form a plane which can contain the axis of rotation 2 of the glass disk 1, or, as in FIG. 1 lie outside the same or intersect the same.

If the direction of the slits falling into the object plane 3 are chosen so that they form substantially an angle of 45° with the plane defined by the ray paths A and B, and if the axis of rotation 2 of the glass disk 1 is substantially parallel to the same plane, the prisms 8 and 8' can be chosen in such a manner that the slits, falling onto the image plane 14, deriving from the ray paths A and B respectively, will be substantially at right angles to each other and substantially form an angle of 45° with the plane defined by the ray paths A and B. If the direction of the slit falling in the object plane 3 is altered, the angle between the slits falling into the image plane 14 will be altered.

The scanning slits on the image plane 14, deriving from the ray path A and ray path B respectively, follow each other in time in an orderly manner according to whether at the rotation of the glass disk ray path A or ray path B is used, on the assumption that the rotation of the glass disk 1 is synchronized with the scanning of the luminous slit in the image plane 3. Depending on the desired alternation time between ray path A and ray path B in relation to usage time of each ray path, the reflecting area on the glass disk 1 may consist of semi-circular rings or, as in FIG. 2, consist of a pair of quarter-circular rings 12a and 12b and 13a and 13b, respectively, separated by transmitting areas of equal size, the speed of rotation of the glass disk 1 being adapted to the desired synchronization of the scanning of the slit falling on the image plane 3.

The relative alternation time is determined by the quotient between the beam diameter in the image plane 5 and the arc length of the reflecting area 12a or 12b or the quotient between the beam diameter at the plane 16 and the arc length on the reflecting area 13a or 13b. If the relative alternation time is required to be especially short, semi-circular rings will therefore be used.

The "out-of-true" or wobble in the bearings of the glass disk is harmful as it generally has a distrubing effect on the timing of the scanning slits. If the scanning slits which are viewed from the pupillary images 5 and 10 should be situated at a short distance from these pupillary images the effect radial wobble or of axial wobble at the bearings of the glass disk 1 could be eliminated by a suitable choice of the prism 8. It is not possible, however, in principle in this case, to eliminate at the same time the effect of the radial and of the axial "out-of-true", that is to say by the same choice of the prism 8. According to the invention therefore the scanning slits which are viewed from the pupillary images 5 and 10 shall be situated at a very great distance from these pupillary images, and the higher the accuracy which is demanded in the timing of the slit formed by the ray path A the greater this distance shall be, all at a given value of wobble at the bearings of the glass disk 1. If these demands regarding distance are fulfilled, which is done with the help of the lens 4 and the lenses 6 and 9, only the radial wobble on the bearings of the glass disk 1 has an effect, with the direction of the scanning slit which is viewed from the pulillary image at 10 being affected. In accordance with the invention the effect of the raidal wobble on the direction is eliminated by an appropriate choice described below of the prism 8, and by adjustment of the lenses 6 and 9 so that they give the unitary magnification. That is to say, the pupillary image 10 will be of a size equal to the pupillary image 5. As a result, the direction of the scanning slit which is formed by means of the ray path A will be unaffected by the wobble in the bearings of the glass disk 1. The demand for insensitiveness to wobble in the bearings of the glass disk 1 for the ray path B is fulfilled by a demand regarding distance which is analogous to the demand regarding distance for the ray path A. This demand is also appropriate from the point of view that the scanning slit image which is viewed from the pupillary image 10 should be situated at a very great distance from the pupillary image 10', so that the ray paths A and B may be pictured further in a uniform manner by the optical system, according to the teachings of the present invention. For the same reason the pupillary image 10' must be made of equal size to the pupillary image 5 by adjustment of the lenses 6' and 9' so that a magnification of unity is obtained.

The prims 8 in the first optical system is selected on the basis of the following considerations. The radial wobble in the bearings of the glass disk 1 gives rise to a rotation of the reflecting surface of the glass disk 1 from its original plane. At reflection on the reflecting area 12a or 12b the principal direction in the ray path A marked by arrows in FIG. 1 is then turned to a direction deviating from the original direction. The deviation of direction is propagated through the ray path A and its direction on arrival at the reflecting area 13a or 13b will be influenced by the construction of the prism 8. The reflection on the reflecting area 13a or 13b produces in the same principal direction a deviation of direction determined by the same radial wobble which is added algebraically to the deviation of direction existing before the reflection. The prism 8 is chosen by known methods so that the algebraic sum of the deviations of direction, whatever they are, becomes zero. In this way the effect of the radial wobble upon the ray path A is eliminated.

The timing of the scanning slit formed by the ray path B is not affected by the radial wobble but instead by a possible wedge-shape of the glass disk 1, where the wedge angle may not exceed a value determined by the accuracy of timing of the corresponding slit image at 14. The roof prism 8' in the ray path B is therefore selected with a view to the desired angle of the slit which is formed by the ray path B relatively to the slit which is formed by the ray path A.

To sum up it can be said that a device in accordance with the invention with the function described above must comprise a rotating glass disk with reflecting areas in the form of circular arc rings and be constructed so that the scanning slits seen from the reflecting areas are at a very great distance and so that the scanning angular magnification between the end points of the ray paths, that is to say their points of reflection and of transmission at the glass disk, is substantially equal to one, all with the object of reducing or eliminating the effect of a wobble in the bearing of the glass disk upon the timing of the scanning slits.

In the embodiment of the device in accordance with the invention described in the drawing the dimensions of the glass disk have been chosen so that the angle between the radii to the simultaneous points of reflection is obtuse. This is advantageous from a point of view of space, but there is nothing to prevent the glass disk from being made so large that the said points of reflection in relation to the diameter of the disk will be situated relatively close to one another, that is to say that the angle is an acute one.

It will be appreciated that the present description has been by way of example only and is not intended as a limitation to the scope of the invention as defined in the appended claims.

I claim as my invention:

1. A device to produce, starting with a slit scanning in its transverse direction, alternately two slits scanning at a certain angle to each other in their transverse directions in a common image plane, comprising a scanning slit, a first and second optical system with image-turning means, a transmitting disk provided with a reflecting layer covering certain parts of one lateral surface of the disk, said disk being arranged so that it rotates about an axis perpendicular to the lateral surface so that the light from said scanning slit alternately first is reflected on a first portion of said reflecting layer, whereupon it passes through the first optical system and is reflected on a second portion of said reflecting layer so that the image of the slit generated by the first system falls into a common image plane, and secondly the light from said scanning slit is transmitted through the disk, whereupon it passes through said second optical system and is again transmitted through said disk so that the image of said slit generated by the second system falls into said common image plane, said scanning slit being so oriented and said image-turning means in said first and second optical systems being so arranged that the desired angle is obtained between said two scanning slit images generated.

2. A device in accordance with claim 1, wherein said first and the second optical system are so designed that they are substantially telescopic on the object side and on the image side, and their angular magnification is substantially unity.

3. A device in accordance with claim 1, wherein said first and second portions of reflecting layer are semicircular rings.

4. A device in accordance with claim 1, wherein said first and second portions of reflecting layer are quarter-circular rings.

* * * * *